United States Patent
Patel et al.

(10) Patent No.: US 10,035,441 B1
(45) Date of Patent: Jul. 31, 2018

(54) DEPLOYABLE ELONGATED MEMBER

(71) Applicant: Ford Global Technologies, LLC, Dearborn, MI (US)

(72) Inventors: Deepak Patel, Canton, MI (US); Zhibing Deng, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/412,172

(22) Filed: Jan. 23, 2017

(51) Int. Cl.
*B60N 2/22* (2006.01)
*B60N 2/75* (2018.01)
*B60R 22/195* (2006.01)
*B60N 2/427* (2006.01)

(52) U.S. Cl.
CPC ............... *B60N 2/753* (2018.02); *B60N 2/22* (2013.01); *B60N 2/42727* (2013.01); *B60R 22/1954* (2013.01)

(58) Field of Classification Search
CPC ...... B60N 2/42727; B60N 2/753; B60N 2/22; B60R 22/1954
See application file for complete search history.

(56) References Cited

U.S. PATENT DOCUMENTS

| | | | |
|---|---|---|---|
| 3,888,540 A | 6/1975 | Protze et al. | |
| 4,881,778 A * | 11/1989 | Stephenson | B60N 2/4606 297/411.32 |
| 5,425,568 A * | 6/1995 | Sliney | B60N 2/22 297/359 |
| 5,730,458 A | 3/1998 | Byon | |
| 6,361,114 B1 * | 3/2002 | Rumler | A47C 7/543 297/411.29 |
| 6,752,422 B2 | 6/2004 | Sauermann | |
| 9,233,660 B1 * | 1/2016 | Farooq | B60N 2/466 |
| 2005/0200186 A1 * | 9/2005 | Schumacher | B60N 2/3047 297/411.38 |
| 2011/0001312 A1 * | 1/2011 | Schubert | B60R 22/38 280/806 |
| 2013/0278038 A1 * | 10/2013 | Tame | B60N 2/4633 297/411.34 |
| 2014/0217787 A1 * | 8/2014 | Fukuzawa | B60R 22/1952 297/216.1 |
| 2015/0021967 A1 * | 1/2015 | Tanaka | B60N 2/42763 297/311 |
| 2015/0091318 A1 * | 4/2015 | Bohner et al. | B60N 2/4633 296/1.09 |
| 2015/0158590 A1 * | 6/2015 | Gehret | B64D 11/062 297/474 |
| 2015/0175039 A1 * | 6/2015 | Jarardi | B60N 2/4207 297/216.1 |

FOREIGN PATENT DOCUMENTS

| | | |
|---|---|---|
| DE | 202008001127 U1 | 7/2009 |
| EP | 1612096 A2 | 1/2006 |
| JP | H05300821 A | 11/1993 |
| JP | 4433291 B2 | 1/2010 |
| JP | 5020586 B2 | 6/2012 |

* cited by examiner

*Primary Examiner* — Drew J Brown
(74) *Attorney, Agent, or Firm* — Frank A. MacKenzie; Bejin Bieneman PLC

(57) ABSTRACT

A seat assembly includes a seatback, an elongated member, a pyrotechnic device, and a wire. The seat assembly may be in a vehicle. The elongated member is rotatably supported by the seatback. The pyrotechnic device is fixed relative to the seatback. The wire is connected to the elongated member and deployably attached to the pyrotechnic device.

16 Claims, 12 Drawing Sheets

US 10,035,441 B1

DEPLOYABLE ELONGATED MEMBER

BACKGROUND

Vehicles may be subject to impact testing standards to assess safety measures for occupants. As one example, the National Highway Traffic Safety Administration (NHTSA) provides a test procedure designed to simulate a vehicle experiencing a side collision with a pole. The NHTSA procedure provides that a test vehicle holding a test dummy as an occupant collides sideways at 20 miles per hour into a rigid vertical pole 10 inches in diameter. Other procedures may be provided by organizations such as the International Institute for Highway Safety (IIHS) and the European New Car Assessment Programme (EuroNCAP). The procedures may measure the effects on anthropomorphic test devices simulating occupants in different positions in a vehicle.

DETAILED DESCRIPTION

Figure 1:
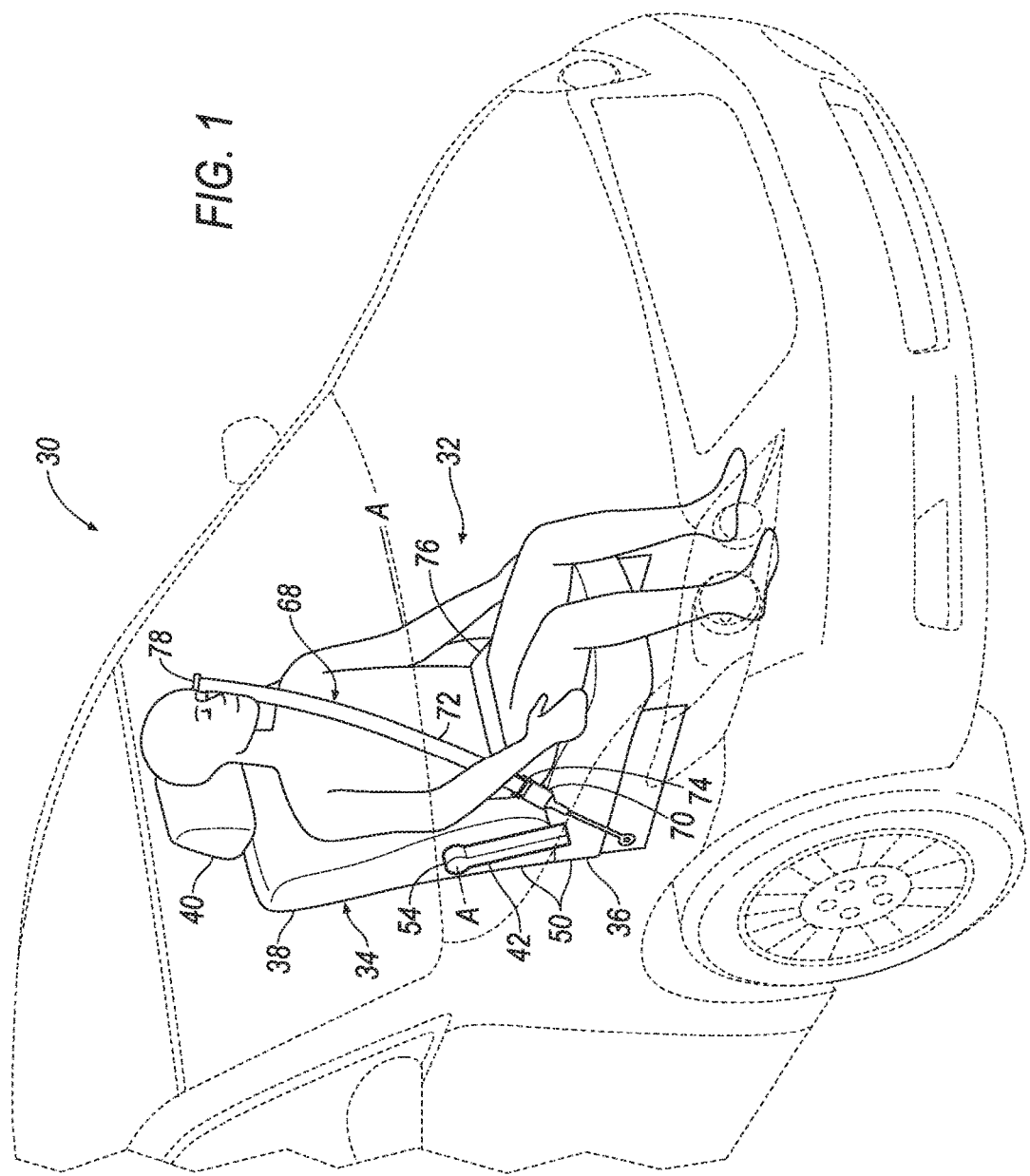
FIG. 1 is a perspective view of a vehicle including a seat.

With reference to the Figures, wherein like numerals indicate like parts throughout the several views, a seat assembly 32 in a vehicle 30 includes a seatback 38, an elongated member 42, a pyrotechnic device 44, and a wire 46. The elongated member 42 is rotatably supported by the seatback 38. The pyrotechnic device 44 is fixed relative to the seatback 38. The wire 46 is connected to the elongated member 42 and deployably attached to the pyrotechnic device 44.

The seat assembly 32 may reduce an ability of an occupant of the vehicle 30 to move inboard, that is, toward a center of the vehicle 30, if the vehicle 30 experiences a frontal or side impact. Specifically, the elongated member 42 may block a torso of the occupant from moving inboard. The seat assembly 32 may reduce a likelihood that the occupant impacts other objects in the vehicle 30, such as seats, other occupants, an instrument panel, etc. The seat assembly 32 may thus reduce a likelihood or severity of injury to the occupant during an impact. The elongated member 42 may also combine with other functions for the occupant, such as serving as an armrest or as a lever for controlling a tilt of the seatback 38, as described in more detail below. The seat assembly 32 may also combine with other restraint systems, such as by pretensioning a seatbelt 68, as described below.

Figure 2:
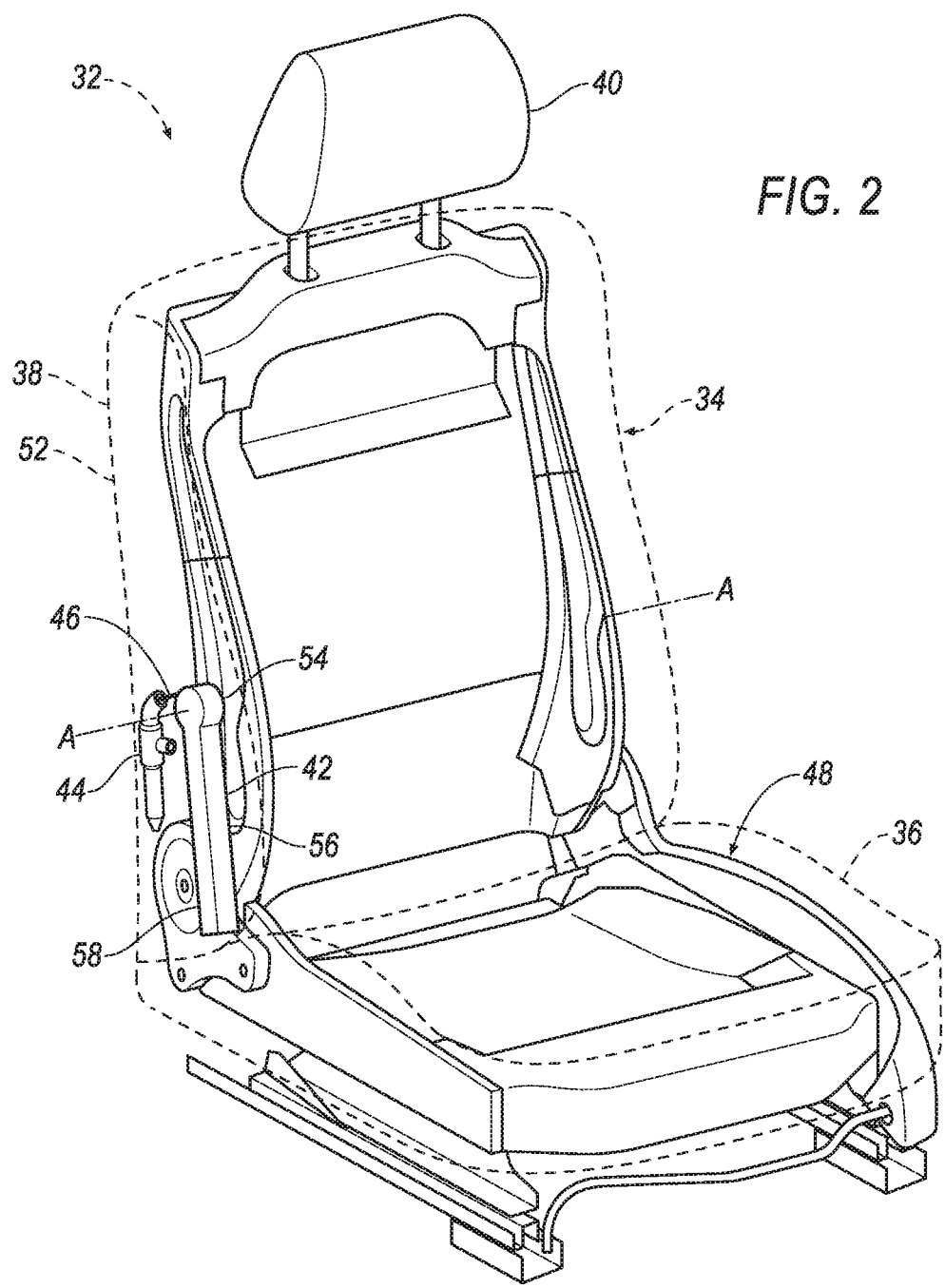
FIG. 2 is a perspective view of the seat.

With reference to FIGS. 1 and 2, the seat assembly 32 includes a seat 34. The seat 34 shown in FIGS. 1 and 2 is a bucket seat, but alternatively the seat 34 may be a bench seat or another type of seat. The seat 34 may include the seatback 38, a seat bottom 36, and a headrest 40. The headrest 40 may be supported by the seatback 38 and may be stationary or movable relative to the seatback 38. The seatback 38 may be supported by the seat bottom 36 and may be stationary or movable relative to the seat bottom 36. The seatback 38, the seat bottom 36, and/or the headrest 40 may be adjustable in multiple degrees of freedom. Specifically, the seatback 38, the seat bottom 36, and/or the headrest 40 may themselves be adjustable, in other words, have adjustable components within the seatback 38, the seat bottom 36, and/or the headrest 40, and/or may be adjustable relative to each other.

With reference to FIG. 2, the seat 34 may include a seat frame 48. The seat frame 48 may include panels and/or may include tubes, beams, etc. The seat frame 48 may support the seatback 38 and/or the seat bottom 36. The seat frame 48 may be formed of any suitable plastic material, e.g., carbon fiber reinforced plastic (CFRP), glass fiber-reinforced semi-finished thermoplastic composite (organosheet), etc. Alternatively, for example, some or all components of the seat frame 48 may be formed of a suitable metal, e.g., steel or aluminum.

With continued reference to FIG. 2, the seat 34 may include cushions 50. The cushions 50 are supported on the seat frame 48. The cushions 50 may be made of cushioning material covered with upholstery. The cushioning material may be formed of foam or any other suitable supportive material. The upholstery may be formed of cloth, leather, faux leather, or any other suitable material. The upholstery may be stitched in panels around the foam. The cushions 50 may be provided on the seat bottom 36, the seatback 38, and/or the headrest 40.

With reference to FIGS. 2-6, the elongated member 42 is rotatably supported by the seatback 38. Specifically, the elongated member 42 is rotatably supported on a side 52 of the seatback 38, that is, a panel facing sideways relative to the seat 34, in other words, lateral to a direction faced by an occupant of the seat 34.

Figure 3:
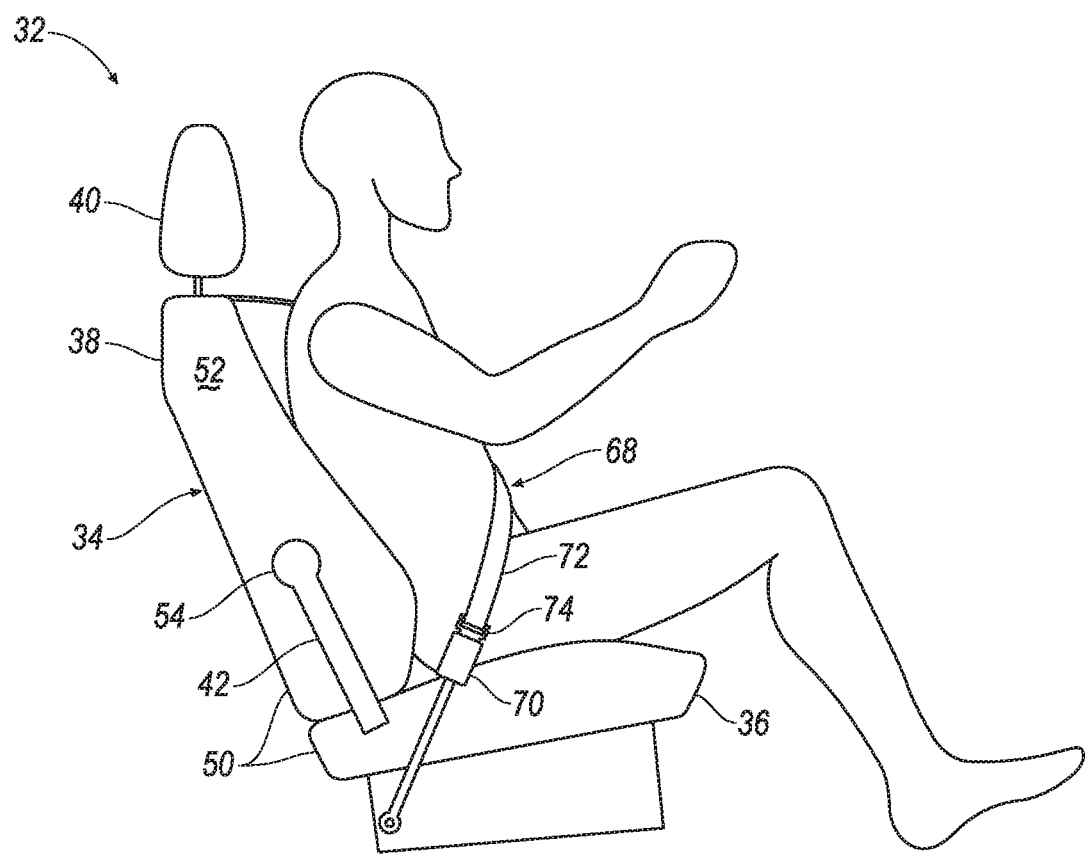
FIG. 3 is a side view of the seat with an elongated member in a lowered position.
Figure 4:
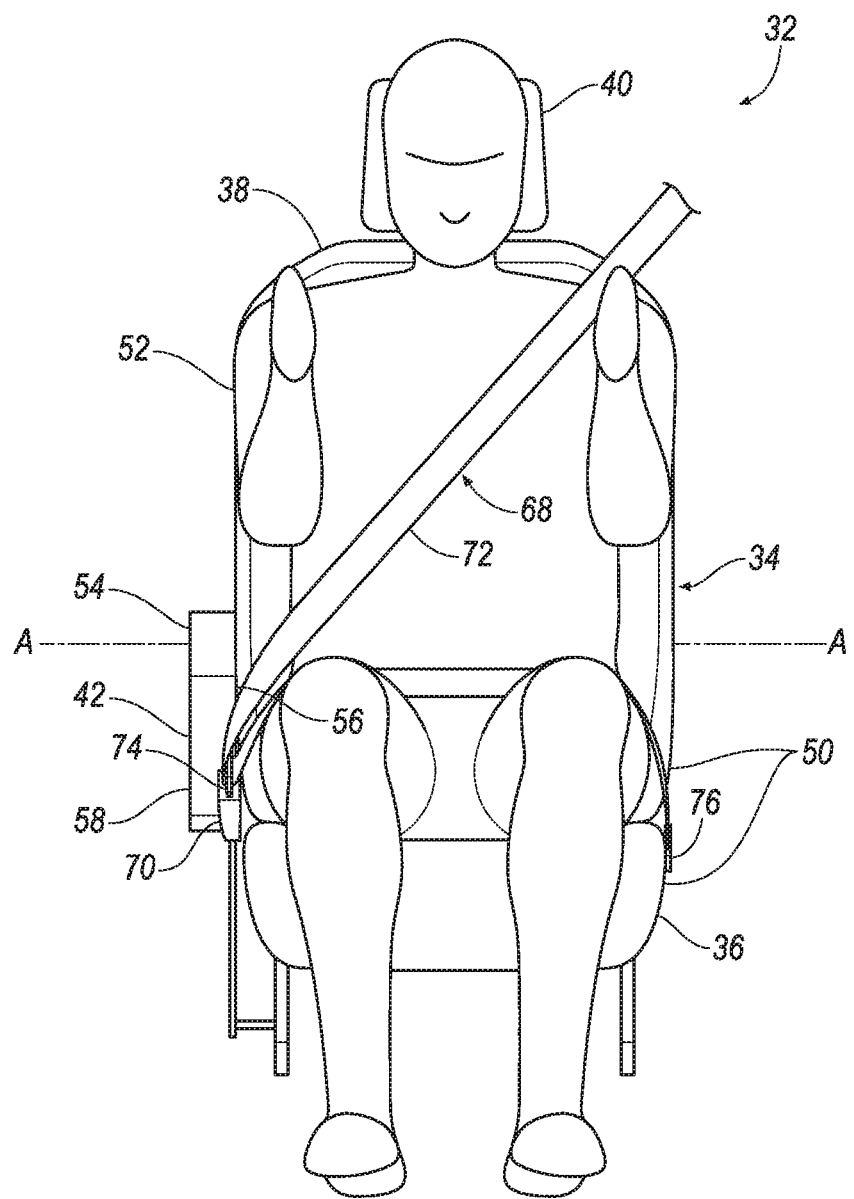
FIG. 4 is a front view of the seat with the elongated member in the lowered position.
Figure 5:
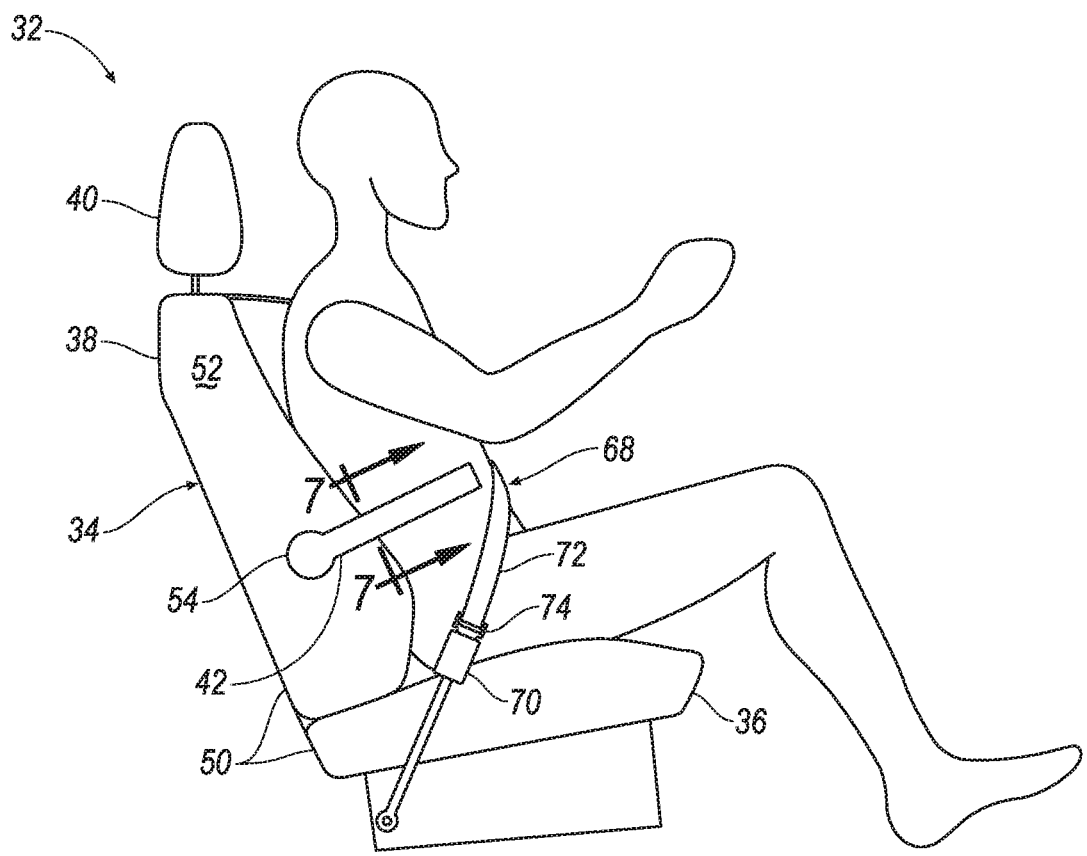
FIG. 5 is a side view of the seat with the elongated member in a raised position.
Figure 6:
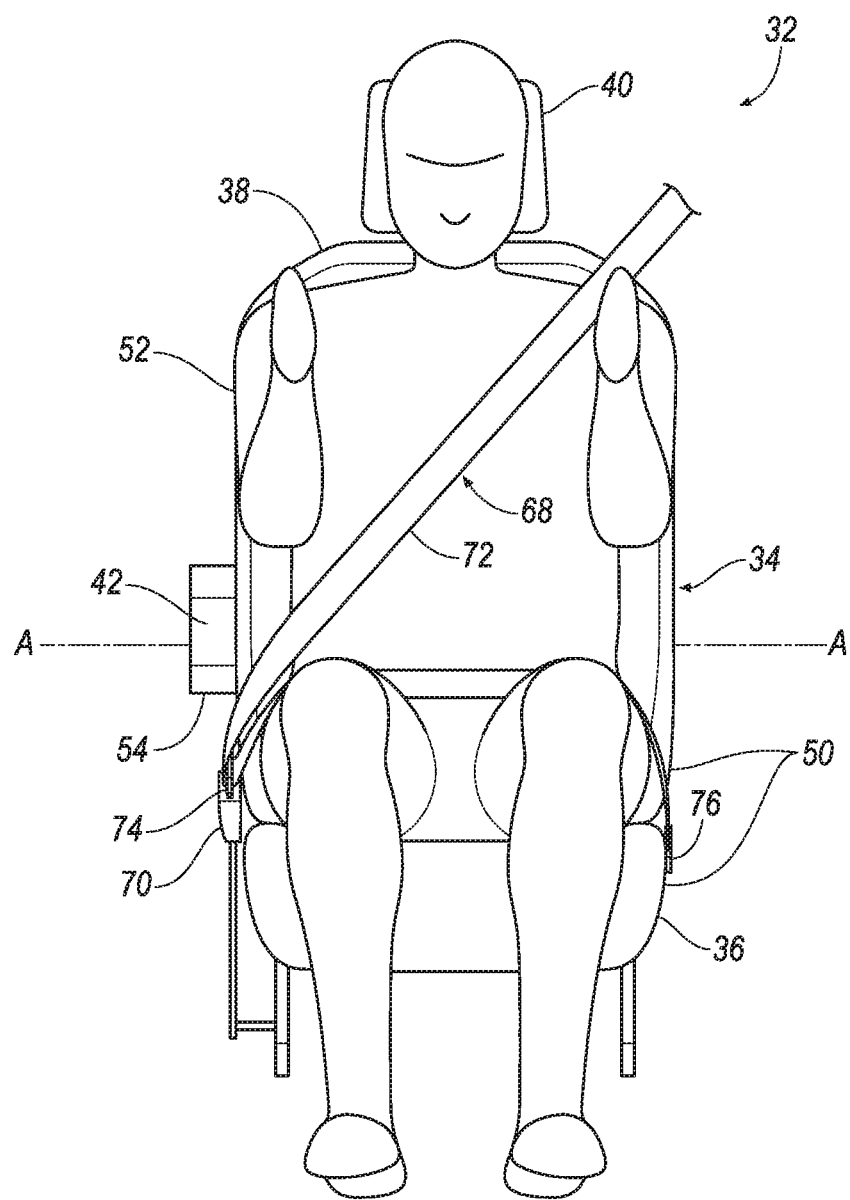
FIG. 6 is a front view of the seat with the elongated member in the raised position.

The elongated member 42 may be rotatable relative to an axis A lateral to the direction faced by the occupant of the seat 34. A pivot 54 may connect the elongated member 42 to the seatback 38. The elongated member 42 may be manually rotatable relative to the seatback 38; in other words, an occupant may be able to rotate the elongated member 42 relative to the seatback 38. For example, the pivot 54 may provide a friction force resisting rotation of the elongated member 42, and the friction force may be sufficiently high that the elongated member 42 does not rotate from its own weight but sufficiently low that the occupant is able to rotate the elongated member 42. The elongated member 42 may be rotatable between a lower position parallel to the seatback 38, as shown in FIGS. 3 and 4, and a raised position transverse to the seatback 38, as shown in FIGS. 5 and 6. In the raised position, the elongated member 42 may point forward relative to the seat 34, that is, in a direction that an occupant of the seat 34 would face. The seatback 38 or the elongated member 42 may include a stopper (not shown) preventing the elongated member 42 from rotating upward past the raised position.

The seatback 38 may include a pin (not shown) that aligns with a hole (not shown) on the elongated member 42 when the elongated member 42 is in the raised position. Alternatively, the elongated member may include the pin, and the seatback may include the hole. The pin may be, e.g., spring-loaded to occupy the hole when aligned. The pin may be retractable via, e.g., a button or knob (not shown) pushing or pulling the pin out of the hole, thereby allowing the elongated member 42 to be rotated about the pivot 54. The pin and hole may allow the elongated member 42 to serve as an armrest for an occupant by preventing downward movement of the elongated member 42 when the occupant rests an arm on the elongated member 42.

Figure 7:
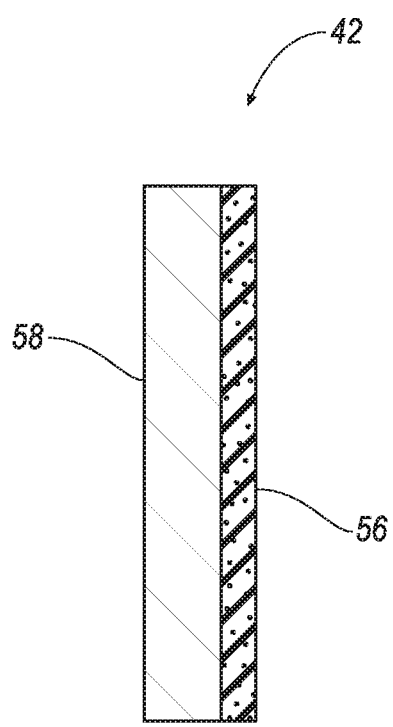
FIG. 7 is a cross-section of the elongated member along line 7-7 in FIG. 5.

With reference to FIG. 7, the elongated member 42 has an interior side 56 facing the seatback 38 and an exterior side 58 facing away from the seatback 38. The interior side 56 may be padded, that is, formed of material that absorbs energy by elastically compressing, which may provide cushioning. The exterior side 58 may be rigid relative to the interior side 56, and the interior side 56 may be compressible relative to the exterior side 58. The exterior side 58 may be formed of plastic, e.g., carbon fiber reinforced plastic (CFRP), glass fiber-reinforced semi-finished thermoplastic composite (organosheet), etc.; or metal, e.g., steel or aluminum.

Figure 10:
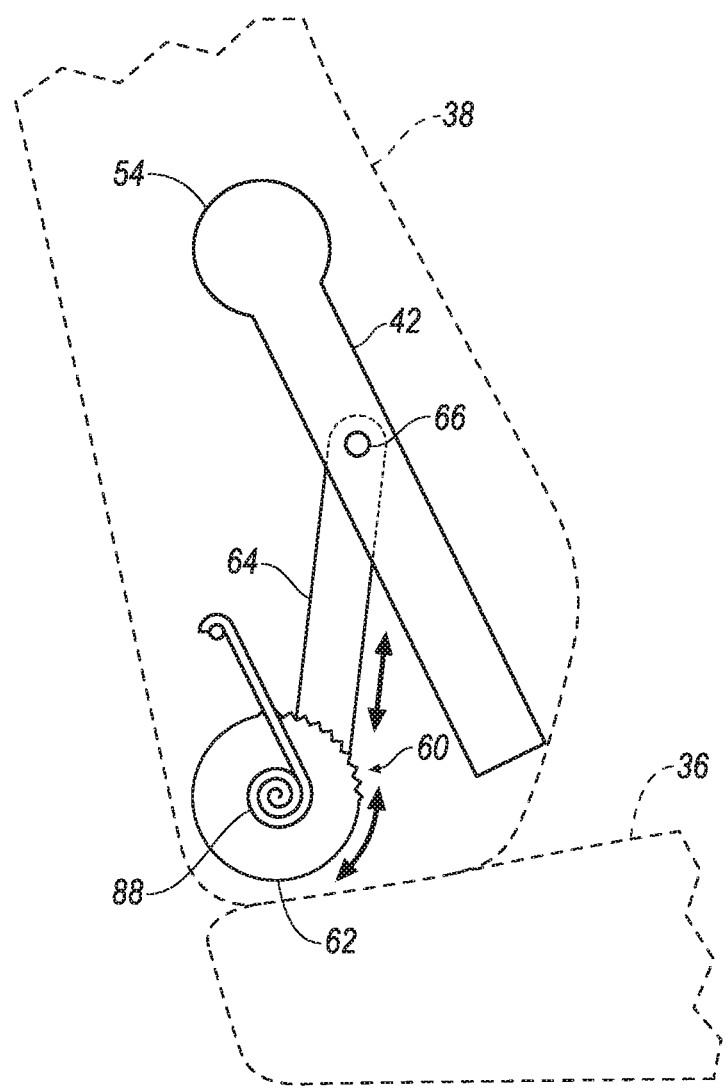
FIG. 10 is a side view of a portion of the seatback of an alternative embodiment of the seat with a reclining mechanism in a first position.
Figure 11:
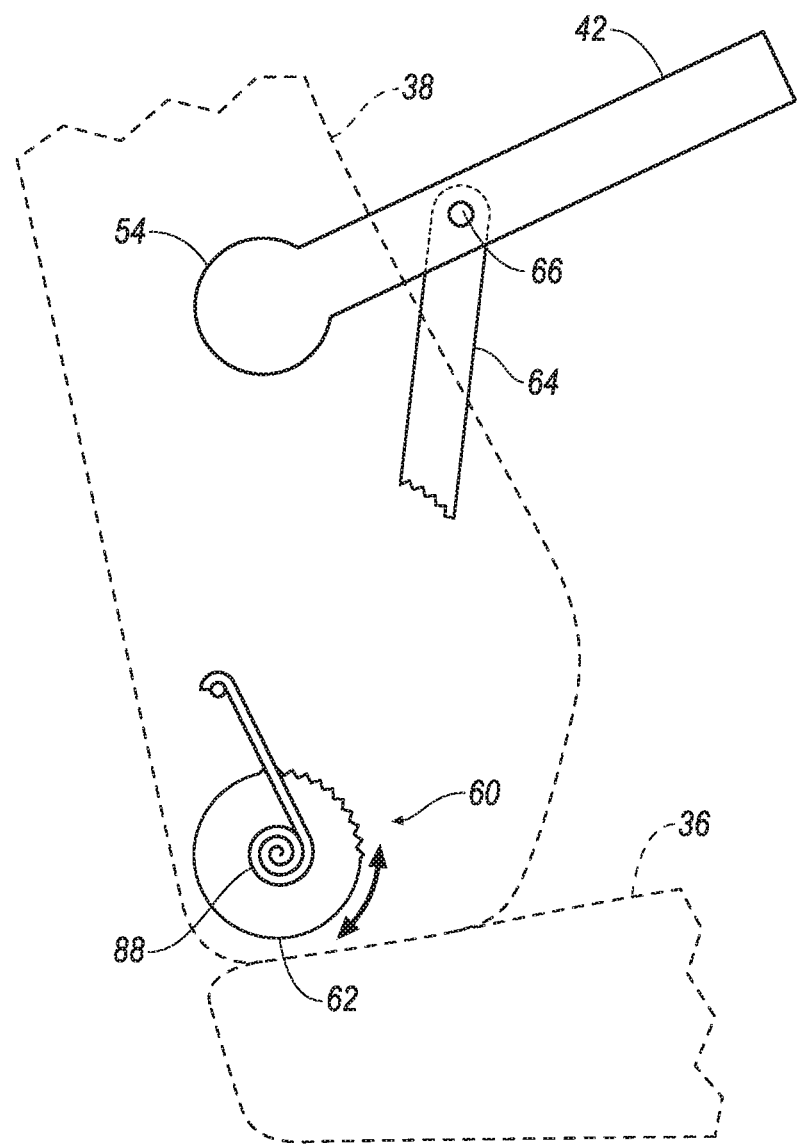
FIG. 11 is a side view of a portion of the seatback of the alternative embodiment of the seat of FIG. 10 with the reclining mechanism in a second position.

With reference to FIGS. 10 and 11, the seatback 38 includes a recliner mechanism 60. The recliner mechanism 60 is switchable between an adjustable state in which the seatback 38 is movable relative to the seat bottom 36 and a fixed state in which the seatback 38 is fixed relative to the seat bottom 36, as is known. For example, the recliner mechanism 60 may include a rotatable member 62 and a slidable member 64 each having a sawtooth engagement area. In the adjustable state, the slidable member 64 is spaced from the rotatable member 62 and thus allows rotation of the rotatable member 62, and in the fixed state, the slidable member 64 is engaged with the rotatable member 62 and thus prevents rotation of the rotatable member 62. The rotatable member 62 may be fixed relative to the seat bottom 36. A radial spring 88 may be connected to the rotatable member 62 and the seatback 38 and be biased so as to tilt the seatback 38 forward relative to the seat bottom 36. Thus, when the recliner mechanism 60 is in the adjustable state, e.g., when the slidable member 64 is spaced from the rotatable member 62, the seatback 38 tends to tilt forward but can be pushed against the force of the radial spring 88 to a position desired by the occupant. Alternatively, the recliner mechanism 60 may be another mechanism for reclining the seatback 38, as is known.

With continued reference to FIGS. 10 and 11, the elongated member 42 may be coupled to the recliner mechanism 60 and serve as a lever for controlling the recliner mechanism 60. For example, the slidable member 64 may be coupled to a connection point 66 on the elongated member 42 spaced from the pivot 54. Thus, rotating the elongated member 42 moves the slidable member 64. The elongated member 42 may be rotatable between a first position in which the recliner mechanism 60 is in the fixed state, as shown in FIG. 10, and a second position in which the recliner mechanism 60 is in the adjustable state, as shown in FIG. 11. Thus, the elongated member 42 may be used by an occupant as a lever causing the recliner mechanism 60 to between the adjustable and fixed states. The connection point 66 may be frangible relative to the elongated member 42, that is, a given force applied to the elongated member 42 will cause the connection point 66 to fail by, e.g., separating before the elongated member 42 fails by, e.g., fracturing or plastically deforming.

Figure 12:
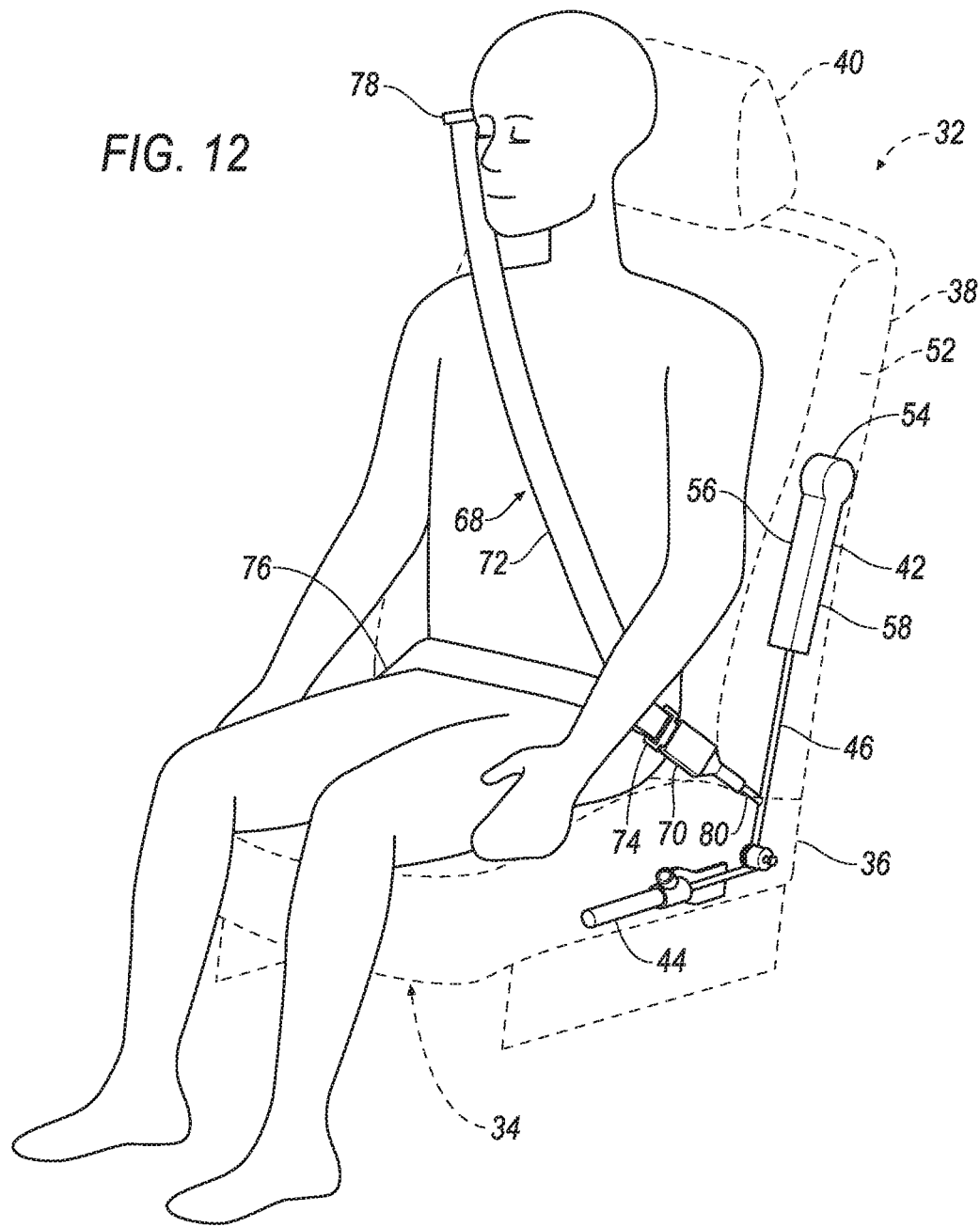
FIG. 12 is a perspective view of another alternative embodiment of the seat.

With reference to FIGS. 1 and 12, the seat assembly 32 may include the seatbelt 68. The seatbelt 68 may include a buckle 70 and webbing 72 including a clip 74 engageable with the buckle 70. The seatbelt 68 may be a three-point harness, meaning that the webbing 72 is attached at three points around the occupant when fastened: an anchor point 76, a retractor 78, and the buckle 70. The seatbelt 68 may, alternatively, include another arrangement of attachment points. The anchor point 76 attaches one end of the webbing 72 to the seat frame 48. The other end of the webbing 72 feeds into the retractor 78, which may include a spool (not shown) that extends and retracts the webbing 72. The clip 74 slides freely along the webbing 72 and, when engaged with the buckle 70, divides the webbing 72 into a lap band and a shoulder band. The buckle 70 may be coupled to the seat frame 48.

Figure 8:
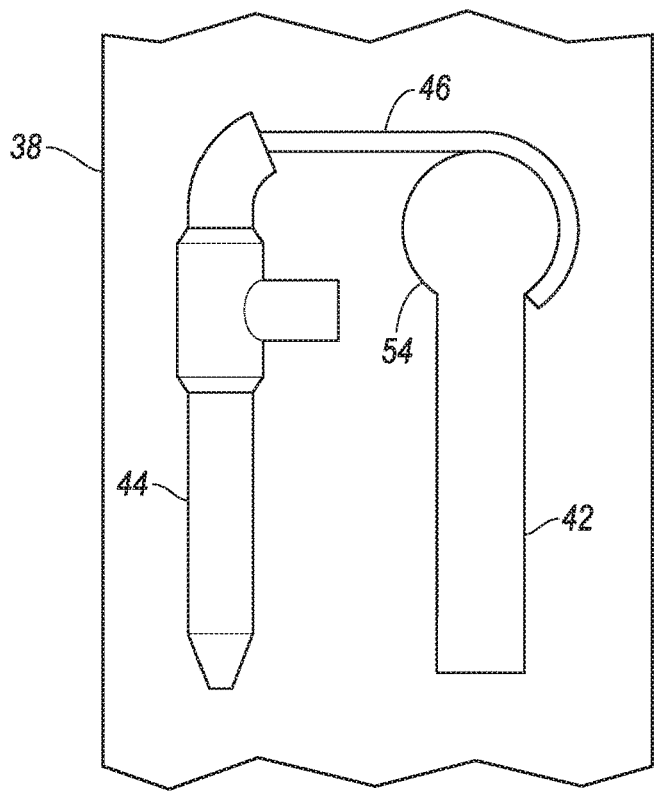
FIG. 8 is a side view of a portion of a seatback of the seat with the elongated member in the lowered position.
Figure 9:
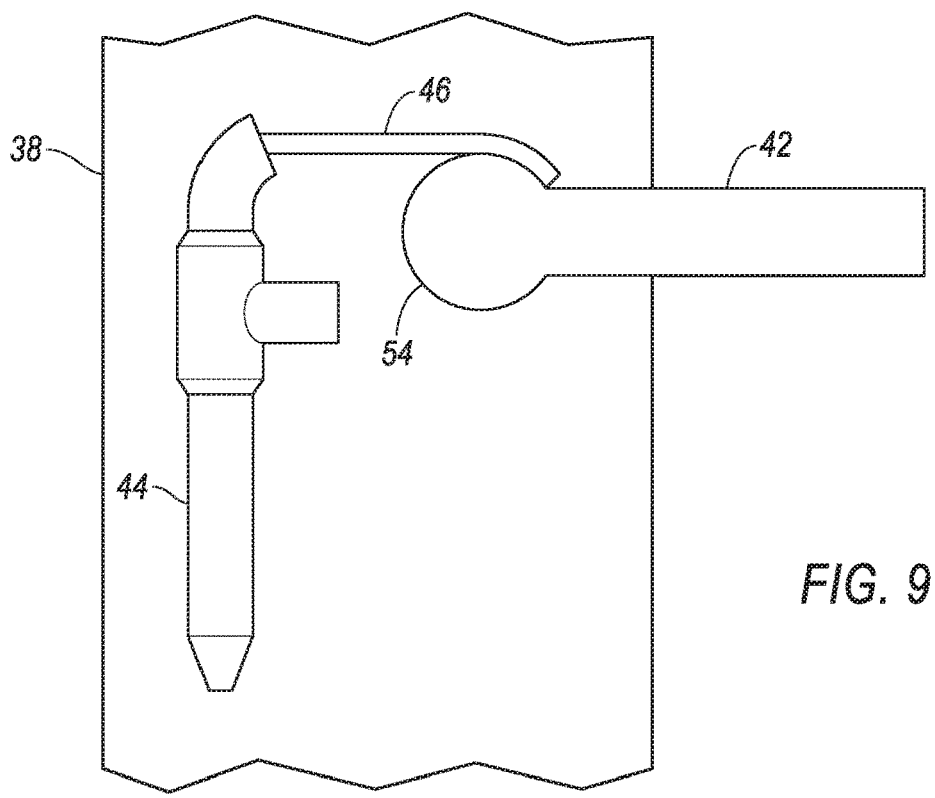
FIG. 9 is a side view of a portion of the seatback of the seat with the elongated member in the raised position.

With reference to FIGS. 2, 8, and 9, the pyrotechnic device 44 may be fixed relative to the seatback 38. For example, the pyrotechnic device 44 may be coupled to the seat frame 48, specifically, the seat frame 48 that supports the seatback 38. Alternatively, as shown in FIG. 12, the pyrotechnic device 44 may be coupled to the seat bottom 36.

The pyrotechnic device 44 is dischargeable from a ready state to a discharged state. The pyrotechnic device 44 may be a linear actuator. For example, the pyrotechnic device 44 may include a piston and pyrotechnic material ignitable by an electric current (not shown). When the current is applied, the pyrotechnic device 44 changes from the ready state to the discharged state, and the pyrotechnic material ignites. The force from the ignition of the pyrotechnic material moves the piston.

With continued reference to FIGS. 2, 8, and 9, the wire 46 is deployably attached to the pyrotechnic device 44. For example, the wire 46 may be coupled to the piston of the pyrotechnic device 44. The wire 46 may be retracted into the pyrotechnic device 44 in the discharged state relative to the ready state. In other words, when the pyrotechnic device 44 discharges, the pyrotechnic device 44 pulls and retracts the wire 46.

The wire 46 is connected to the elongated member 42. The wire 46 is configured to rotate the elongated member 42 to the raised position. The wire 46 is attached to the elongated member 42 such that discharging the pyrotechnic device 44 causes the elongated member 42 to rotate to the raised position. For example, the wire 46 may extend at least partially around the pivot 54. When the wire 46 is retracted, the wire 46 pulls on the elongated member 42 and causes a moment about the pivot 54 tending to rotate the elongated member 42. Other attachment arrangements that cause the elongated member 42 to rotate to the raised position are possible.

The wire 46 may be able to transmit forces in tension but not in compression; that is, the wire 46 may be able to pull but not to push. When an occupant manually rotates the elongated member 42 to the raised position, slack is introduced into the wire 46 between the elongated member 42 and the pyrotechnic device 44. If the pyrotechnic device 44 discharges when the elongated member 42 is in the raised position, the slack in the wire 46 is taken up by the pyrotechnic device 44, but the elongated member 46 remains in the raised position. When the occupant manually rotates the elongated member 42 to the lower position, the slack is taken out of the wire 46.

The wire 46 may be formed of any material allowing the wire 46 to be flexible and to have a high tensile strength relative to a force from the pyrotechnic device 44. For example, the wire 46 may be formed of braided steel wires.

With reference to FIG. 12, the pyrotechnic device 44 may be deployably coupled to the seatbelt 68, e.g., to the buckle 70. For example, the wire 46 is coupled to the elongated member 42, and a second wire 80 may be coupled to the wire 46 and to the buckle 70. Alternatively, the second wire 80 may be coupled directly to the pyrotechnic device 44. When the pyrotechnic device 44 discharges and retracts the wire 46, the pyrotechnic device 44 may also retract the second wire 80. Thus, the pyrotechnic device 44 may serve as a pretensioner for the seatbelt 68.

Figure 13:
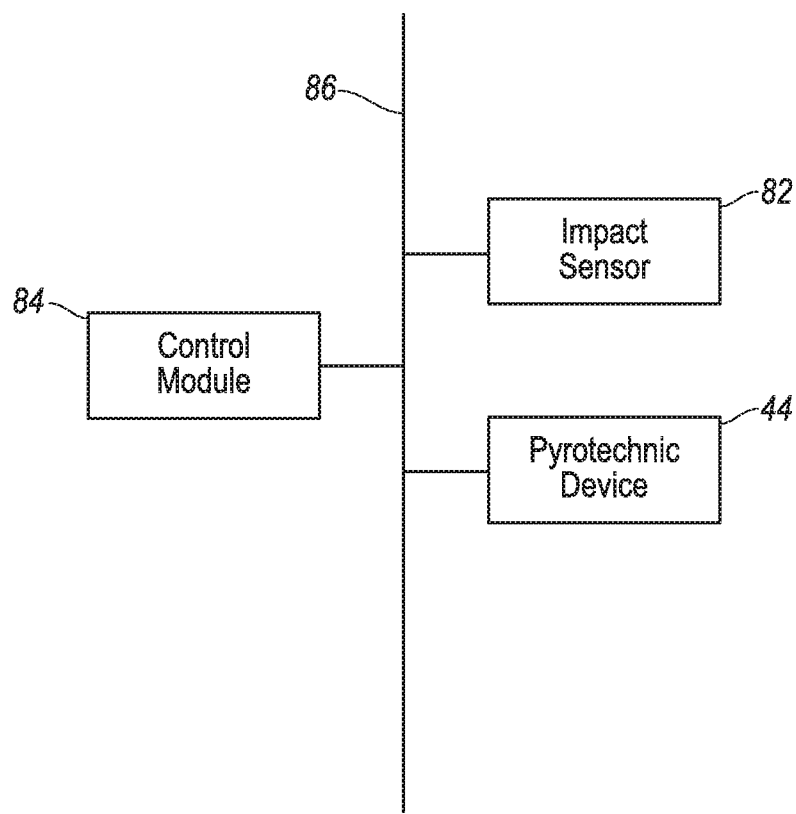
FIG. 13 is a block diagram of a control system for the elongated member of the seat.

With reference to FIG. 13, the vehicle 30 may include an impact sensor 82. The impact sensor 82 is adapted to detect an impact to the vehicle 30. The impact sensor 82 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 82 may be located at numerous points in or on the vehicle 30.

The vehicle 30 may include a control module 84. The control module 84 may be a microprocessor-based controller. The control module 84 may include a processor, memory, etc. The memory of the control module 84 may include memory for storing instructions executable by the processor as well as for electronically storing data and/or databases. The control module 84 may be a restraint control module and may be in communication with and may control airbags (not shown) in the vehicle 30, among other functions.

With continued reference to FIG. 13, the control module 84 may transmit and receive signals through a communications network 86 such as a controller area network (CAN) bus, Ethernet, Local Interconnect Network (LIN), and/or by any other wired or wireless communications network. The control module 84 may be in communication with the impact sensor 82 and the pyrotechnic device 44 through the communications network 86.

The control module 84 may be programmed to instruct the pyrotechnic device 44 to discharge in response to a side collision. More specifically, the control module 84 may be programmed to instruct the pyrotechnic device 44 to discharge in response to a side collision to a side of the vehicle 30 farther from the seat 34. For example, for a seat 34 on the left side of the vehicle 30, the control module 84 is programmed to discharge when the vehicle 30 experiences a side collision to the right side. Alternatively or additionally, the control module 84 may be programmed to instruct the pyrotechnic device 44 to discharge in response to a frontal collision to the vehicle 30.

In the event of an impact, the impact sensor 82 may detect the impact and transmit a signal through the communications network 86 to the control module 84. If the control module 84 determines that the impact was a side impact to a side of the vehicle 30 farther from the seat 34 or a frontal impact, then the control module 84 may transmit a signal through the communications network 86 to the pyrotechnic device 44. The pyrotechnic device 44 may discharge and retract the wire 46. If the seat assembly 32 includes the second wire 80 coupled to the buckle 70, discharging the pyrotechnic device 44 pulls the second wire 80 and the buckle 70, pretensioning the seatbelt 68 around an occupant of the seat 34. The pyrotechnic device 44 retracts and applies tension to the wire 46, which causes a moment on the elongated member 42 about the pivot 54. The elongated member 42 rotates around the pivot 54 from the lowered position or from whatever the current position of the elongated member 42 is to the raised position. If the elongated member 42 is coupled to the recliner mechanism 60, the connection point 66 may break.

If the impact was a side impact, the side impact may cause the occupant to have lateral momentum relative to the seat 34 inboard, that is, toward a center of the vehicle 30. The elongated member 42 in the raised position may block the occupant from moving laterally inboard. Specifically, the interior side 56 of the elongated member 42 impedes movement of a torso of the occupant laterally inboard. The elongated member 42 may reduce injuries to the occupant of the seat 34 by preventing the occupant from impacting other objects within the vehicle 30, such as other seats, other occupants, etc.

If the impact was a frontal impact, the impact may cause the occupant to have a forward momentum into an airbag (not shown). The elongated member 42 in the raised position may block the occupant from moving laterally inboard. The elongated member 42 may thus prevent or reduce the occupant from sliding off of the airbag. The elongated member 42 may reduce injuries to the occupant of the seat 34 by preventing the occupant from impacting other objects within the vehicle 30, such as an instrument panel (not shown).

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat assembly comprising:
a seatback;
an elongated member rotatably supported by the seatback between a lowered position parallel to the seatback and a raised position transverse to the seatback;
a pyrotechnic device fixed relative to the seatback; and
a wire connected to the elongated member and deployably attached to the pyrotechnic device, the wire positioned to rotate the elongated member to the raised position upon discharge of the pyrotechnic device.

2. The seat assembly of claim 1, further comprising a pivot connecting the elongated member to the seatback, wherein the wire extends at least partially around the pivot.

3. The seat assembly of claim 1, wherein the elongated member is manually rotatable relative to the seatback.

4. The seat assembly of claim 1, wherein the pyrotechnic device is dischargeable from a ready state to a discharged state.

5. The seat assembly of claim 4, wherein the wire is retracted into the pyrotechnic device in the discharged state relative to the ready state.

6. The seat assembly of claim 1, further comprising a control module in communication with the pyrotechnic device and programmed to instruct the pyrotechnic device to discharge in response to a vehicle side impact.

7. The seat assembly of claim 1, further comprising a seatbelt, wherein the pyrotechnic device is deployably coupled to the seatbelt.

8. The seat assembly of claim 7, wherein the seatbelt includes a buckle and webbing including a clip engageable with the buckle.

9. The seat assembly of claim 8, wherein the pyrotechnic device is deployably coupled to the buckle.

10. The seat assembly of claim 1, wherein the elongated member is rotatably supported on a side of the seatback.

11. The seat assembly of claim 10, wherein the elongated member has an interior side facing the seatback and the interior side is padded.

12. The seat assembly of claim 1, further comprising a seat frame supporting the seatback, and a seat bottom supported by the seat frame.

13. The seat assembly of claim 12, wherein the pyrotechnic device is coupled to the seat frame.

14. The seat assembly of claim 12, wherein the seatback includes a recliner mechanism switchable between an adjustable state in which the seatback is movable relative to the seat bottom and a fixed state in which the seatback is fixed relative to the seat bottom.

15. The seat assembly of claim 14, wherein the elongated member is coupled to the recliner mechanism.

16. The seat assembly of claim 15, wherein the elongated member is rotatable from a first position in which the recliner mechanism is in the fixed state and a second position in which the recliner mechanism is in the adjustable state.

* * * * *